Nov. 4, 1924.
J. G. VINCENT
1,513,945
GEAR DRIVING MECHANISM
Filed June 16, 1917
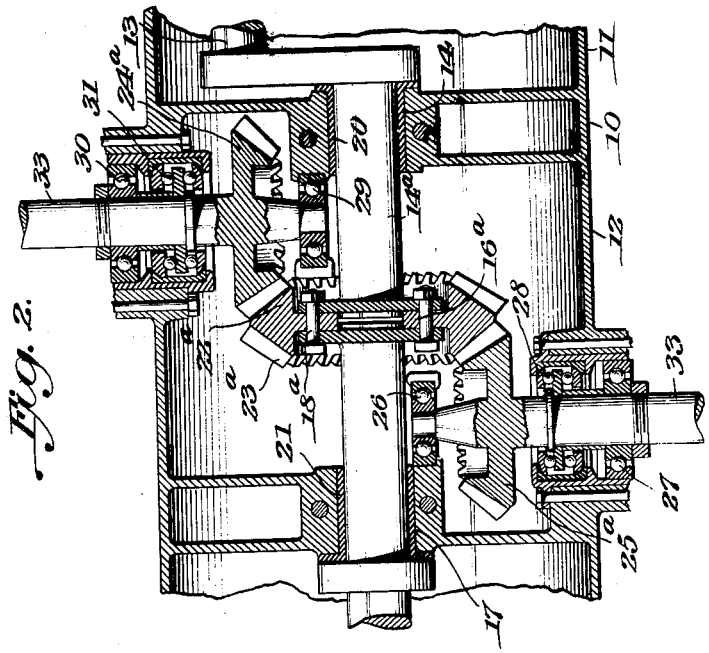
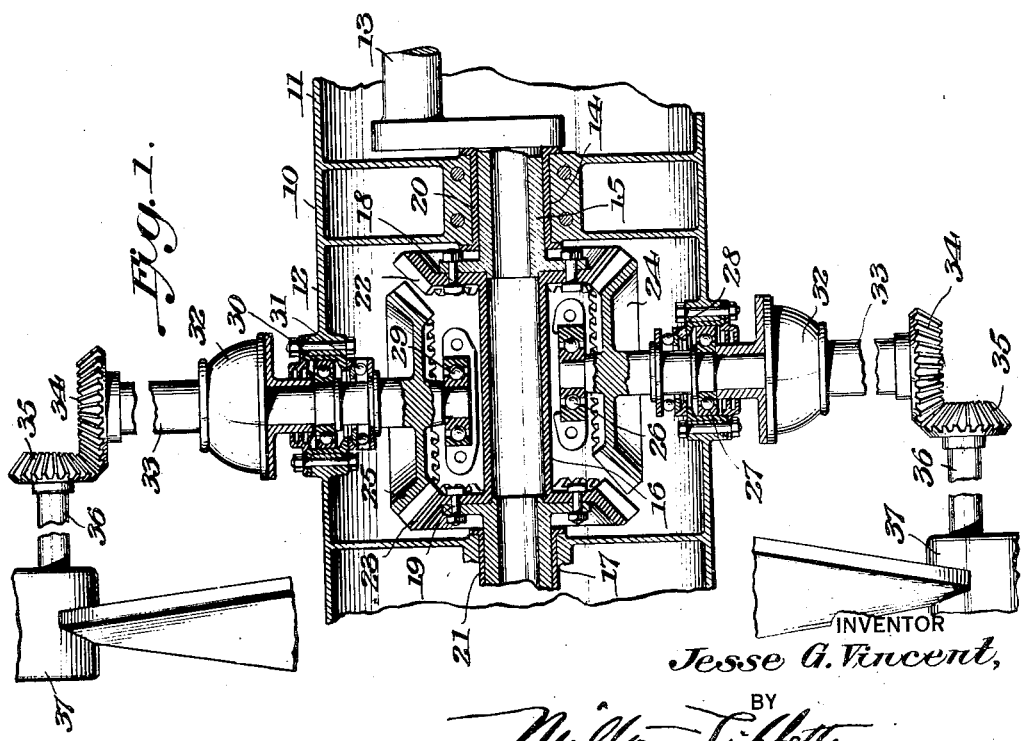
INVENTOR
Jesse G. Vincent,
BY
Milton Tibbetts, ATTORNEY Patented Nov. 4, 1924.

1,513,945

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

GEAR DRIVING MECHANISM.

Application filed June 16, 1917. Serial No. 175,124.

*To all whom it may concern:*

Be it known that I, JESSE G. VINCENT, a citizen of the United States, and resident of Detroit, Wayne County, State of Michigan, have invented certain new and useful Improvements in Gear Driving Mechanism, of which the following is a specification.

This invention relates to gear driving mechanism and particularly to such mechanism involving bevel gears and shafts therefor.

One of the objects of the invention is to provide a double drive from a single source in which the end thrusts will be balanced so far as the driving shaft is concerned.

Another object of the invention is to provide a novel and efficient driving mechanism for aeroplane propellers particularly where two such propellers are used and driven from a single source of power.

Another object of the invention is to provide a driving mechanism from a single shaft to two driven shafts in which the end thrusts on the driving shaft will be balanced.

Other objects of the invention will appear from the following description taken in connection with the drawing, which forms a part of this specification, and in which:—

Fig. 1 is a plan and part sectional view of a mechanism containing this invention, and Fig. 2 is a similar view of another form of the invention.

Referring to the drawings 10 represents a supporting structure which may be a casing, the part 11 of which may constitute a crank case of a hydrocarbon or other motor forming a source of power. The part 12 is shown in the form of a casing for some of the gears and shafts of the invention.

A motor crank shaft is illustrated at 13 and the extended part 14 of this shaft forms the main driving shaft of the gear mechanism of this invention. This extended part as illustrated is in three tubular portions 15, 16 and 17, which are rigidly secured together as by bolts 18 and 19, and some of these portions are formed integral with some of the gears hereinafter mentioned.

This main driving shaft as a whole is mounted in the casing in aligned bearings 20 and 21, and it will be understood that with the arrangement shown there may be one motor connected at one end of the shaft or there may be a motor connected at each end of the shaft or the shaft itself may form the middle part of the crank shaft of a single motor. It is important however that in any case, where power is to be taken from this shaft there should be as little end thrust as possible on the motor shaft and in the present invention such end thrust is practically eliminated although the power is taken from the main driving shaft through bevel gears.

The main driving shaft 14 is provided with a pair of oppositely facing bevel gears 22 and 23 of similar size and form. These gears are somewhat separated and the gear 22 is adapted to mesh with a bevel gear 24 and the gear 23 is adapted to mesh with a gear 25, the gears 24 and 25 being on opposite sides of the shaft 14 and slightly out of alignment so that there will be no interference. The gear 24 is mounted in compartment 12 of the casing 10 in bearings 26 and 27, the latter including a thrust bearing 28 which takes the outward end thrust of the gear 24. The gear 25 is also mounted in the compartment 12 and in similar bearings 29 and 30, the latter including a thrust bearing 31. The gears 24 and 25 are connected through universal joints 32 with shafts 33 extending laterally from the casing 10, and the outer ends of these shafts 33 have bevel gears 34 meshing with gears 35 on shafts 36 of propellers 37, the latter consituting driving propellers of an aeroplane or similar vehicle.

From the above description of the mechanism shown in Fig. 1 of the drawing it will be apparent that the end thrust on the main driving shaft 14 caused by the meshing of gears 22 and 24 will be exactly balanced by the end thrust caused by the meshing of the gears 23 and 25 and there will therefore be no resulting end thrust on the shaft 14 to be taken by the bearing supporting that shaft.

The axial end thrust of the gears 24 and 25 will be taken by their respective thrust bearings 28 and 31, or, when the universal joints 32 are so formed as to be capable of transmitting end thrust, some of the thrust of these gears 24 and 25 will be balanced by the reverse end thrust of the bevel gears 34. Of course suitable bearings, not shown, will be provided for the shafts 36 to take whatever end thrust there may be on those shafts.

In Fig. 2 the main shaft 14ᵃ is in two portions only, these portions being connected together as by the bolts 18ª and the webbed portion 16ª of the gears hereinafter referred to. Also the gears 22ª and 23ª are shown as integral and are facing away from each other instead of towards each other as in Fig. 1. The gears 24ª and 25ª are similar to the corresponding gears in Fig. 1 and mesh respectively with the gears 22ª and 23ª. The other parts of the mechanism are similar to that shown in Fig. 1.

It will be seen that in the mechanism shown in Fig. 2 there is also a balancing of the end thrust of the gears 22ª and 23ª so that there is practically no end thrust on the main shaft 14ª.

Other forms of the invention may be made without departing from the scope of the invention shown and it is intended that such modifications shall be within the scope of the claims appended hereto.

Having thus described my invention, what I claim and desire to secure by Letters Patent is:—

1. The combination with a support, of a gear shaft, motor crank shafts mounted in said support and directly connected to either end of said gear shaft, two laterally extending driven shafts mounted in bearings in said support, and a pair of bevel gears connecting each of said driven shafts to said gear shaft.

2. The combination with a support, of two aligned motor shafts mounted in said support, two laterally extending driven shafts mounted in bearings in said support, means connecting said motor shafts, and a pair of bevel gears connecting each of said driven shafts to the motor shafts.

In testimony whereof I affix my signature.

JESSE G. VINCENT.